March 31, 1942.   R. B. NAWMAN   2,277,711
APPARATUS FOR PITTING HALF FRUIT
Filed Aug. 8, 1939   4 Sheets-Sheet 1
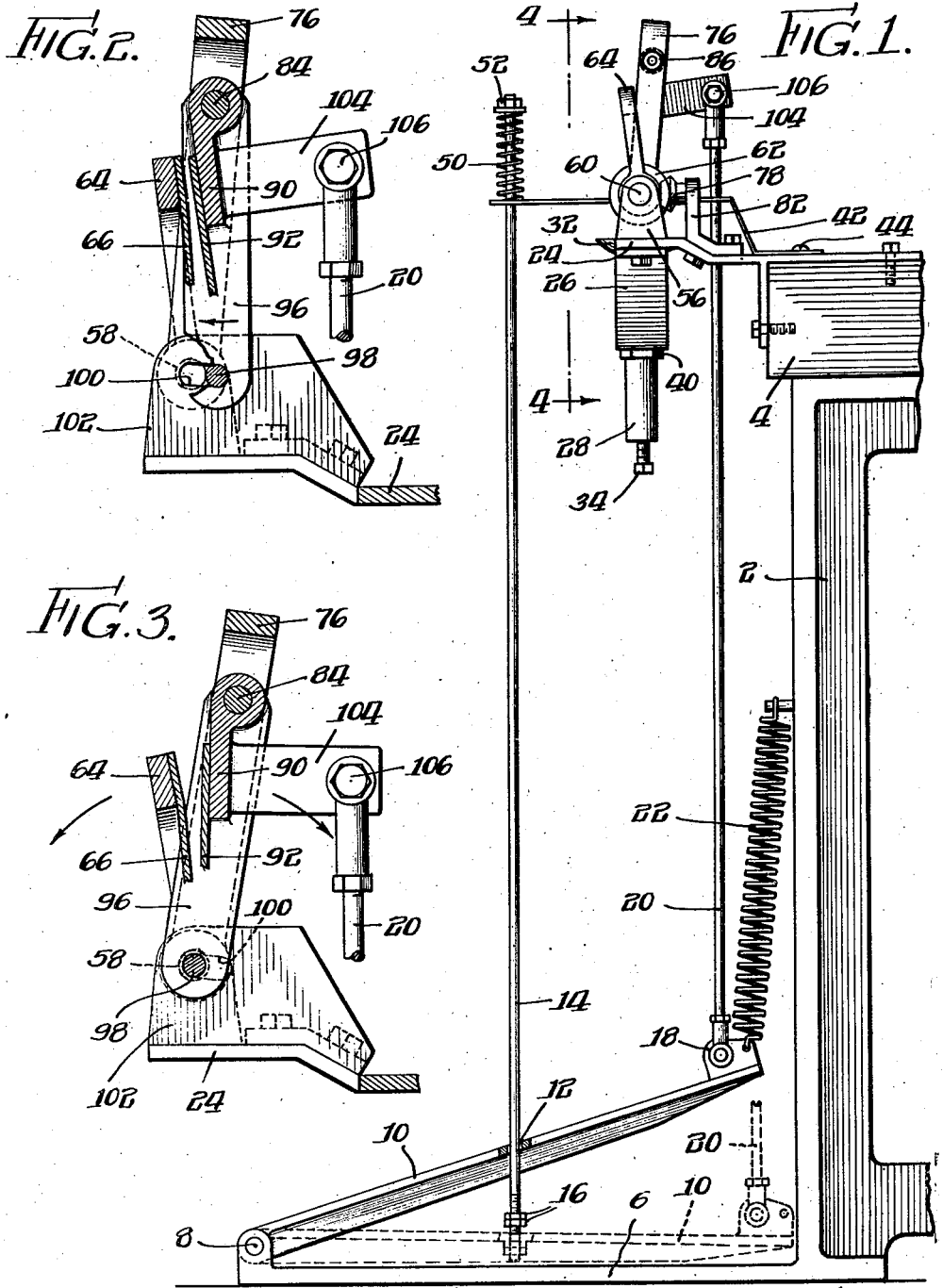

March 31, 1942.  R. B. NAWMAN  2,277,711
APPARATUS FOR PITTING HALF FRUIT
Filed Aug. 8, 1939  4 Sheets-Sheet 2

Inventor
R. B. Nawman
By: Cox & Moore
attys.

March 31, 1942. R. B. NAWMAN 2,277,711
APPARATUS FOR PITTING HALF FRUIT
Filed Aug. 8, 1939 4 Sheets-Sheet 3
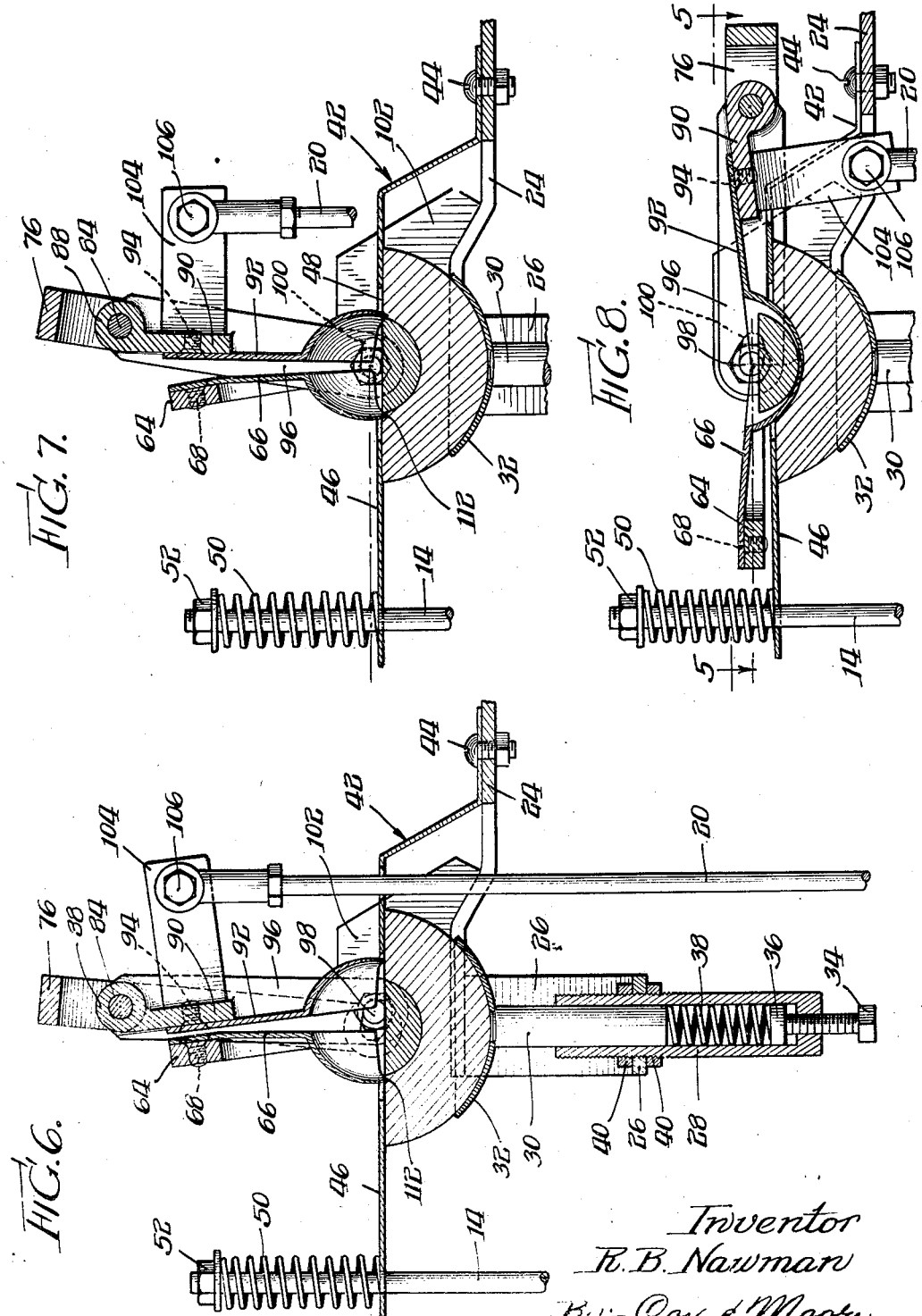

March 31, 1942. R. B. NAWMAN 2,277,711
APPARATUS FOR PITTING HALF FRUIT
Filed Aug. 8, 1939 4 Sheets-Sheet 4

Inventor
R. B. Nawman
By:- Cox & Moore
Attys.

Patented Mar. 31, 1942

2,277,711

UNITED STATES PATENT OFFICE 2,277,711

APPARATUS FOR PITTING HALF FRUIT

Rollie B. Nawman, Oakland, Calif., assignor to Special Equipment Company, Portland, Oreg., a corporation of Oregon Application August 8, 1939, Serial No. 288,961

15 Claims. (Cl. 146—28)

This invention relates to apparatus for removing the central seed-containing section from halved fruits, and particularly does it relate to a device for removing the pits from peaches, such as clingstone peaches.

The present application is a continuation in part of my co-pending application, Serial No. 283,202, filed July 7, 1939, which in turn is a continuation in part of my application, Serial No. 55,030, filed December 18, 1935.

Among the objects of the present invention are to provide means whereby power applied to one of two cooperative cutters may through suitable interconnecting devices be transmitted to the other cooperative cutter and in such a manner as to permit one of said cutters to move independently of the other and relatively thereto in a preliminary pit-locating movement and thereafter to move simultaneously and cooperatively with said other cutter in pit-excising movements whereby completely and efficiently to sever the pit from the halved fruit; to provide a pitting mechanism for half fruit including a pair of cooperative pitting blades adapted to move around the under surface of the half pit of a halved fruit to excise the same, wherein means is provided for permitting one of the blades to have a preliminary pit locating movement laterally across the cut face of the half fruit into contact with the edge of the pit and without digging into or gouging the cut face of the half fruit, and for thereafter simultaneously moving the cooperating pitter blade around the under surface of the half pit; to provide a compact device for operating both of the pitting blades from a common source of power and through suitable gearing to provide a preliminary pit locating travel to one of the pitting blades prior to the actual pit severing action; to provide a flexible power transmitting means for driving both of said blades while imparting a pit locating movement to at least one of said blades; to provide a pitting mechanism for halved fruit and the like including two cooperative pitting blades with interconnected power transmitting means between said blades, constructed and arranged to permit one blade to move laterally across the cut face of the halved fruit to locate the margin of the pit, while the other blade remains relatively at rest, and thereafter to cause both blades to sever the flesh of the fruit adjacent the peripheral underside of the pit, the blades moving with equalized speeds in approaching directions; to provide a pitting mechanism including a pair of pitting blades together with actuating means for the blades including gearing interconnecting the blades to permit relative movement between the blades, to cause said blades to move with equalized speed, and/or to permit said blades to move relatively and thereafter to cause said blades to move simultaneously at equalized speeds in approaching directions around the periphery of the pit to sever the same; to provide a pitting mechanism for halved fruit including a pair of cooperative pitting blades with power transmitting interconnections constructed and arranged to permit relative pit locating movement between said blades without severing the cut flesh of the halved fruit, and thereafter to cause said blades simultaneously to cut through the flesh of the halved fruit to sever the pit, the blades moving in substantially true arcs of circles adjacent the periphery of the pit whereby to carry out the pit severing operation; to provide certain adjustments for the cup holding the half fruit permitting adjustments for variant sizes of halved fruit; to provide means for adjustably determining the pressure exerted upon the cut flesh of the halved fruit in a direction away from the pit during the severance of the pit, whereby to provide a cutting action that closely follows the under side of the half pit; to provide these and other objects of invention as will be more particularly made apparent from a perusal of the following specification when taken in connection with the accompanying drawings, wherein:

Fig. 1 is a side elevation of the machine showing the rod connections with the foot pedal control and the means for operating the pitting mechanism;

Fig. 2 is a vertical section taken on line 2—2 of Fig. 4;

Fig. 3 is the same view as Fig. 2, with the parts in a different position;

Figure 4:
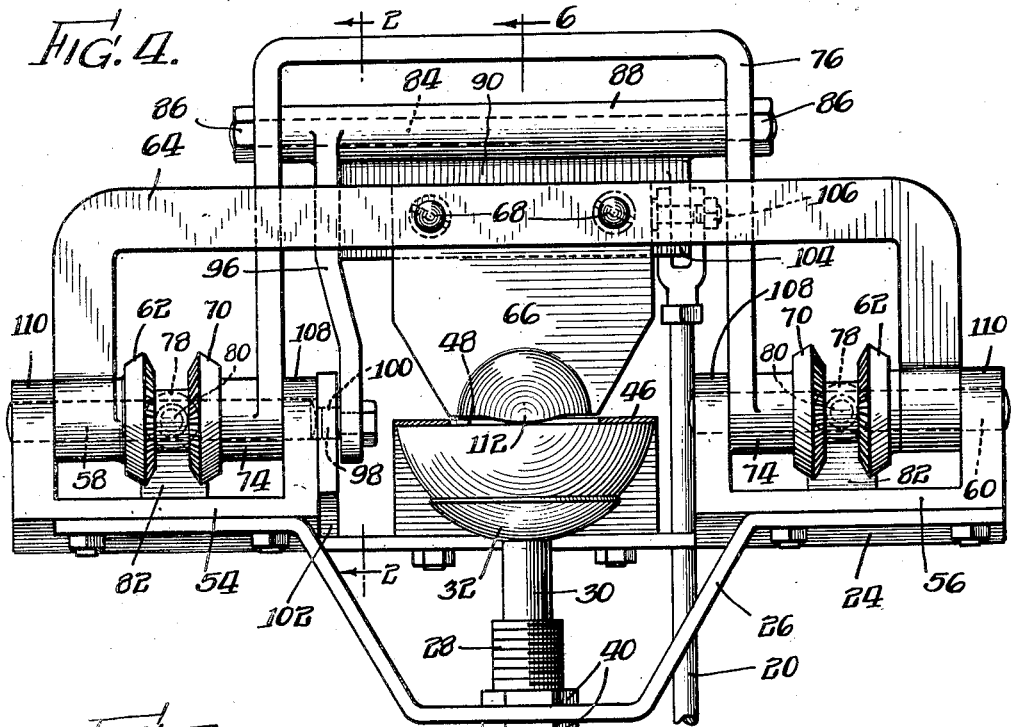
Fig. 4 is a front sectional view of the machine, taken on line 4—4 of Fig. 1.

Figs. 6, 7 and 8 are vertical sectional views, taken on line 6—6 of Fig. 4 and showing the different stages of the pit locating and pit excising operation; and Figs. 9, 10, 11 and 12 are vertical sectional views showing more diagrammatically the steps and method of the pit locating and pit severing operation.

Referring now to the invention in general, the invention has been disclosed as applied to a semi-automatic machine wherein a halved fruit, such for instance as a halved peach, is either held in the hand or is inserted manually in a half peach holder with its cut face uppermost and with its half pit exposed, and wherein actuated means is provided for actuating two pitter blades, each having a cutting edge conforming substantially to the maximum diameter of the half pit in the plane of the surface of the halved fruit from which it is to be severed, together with a novel type of interconnecting power transmitting means from said actuated means to one of said pitting blades and from said pitting blade, through gearing, to the other pitter blade, the construction being such that a pit-locating movement is imparted to at least one of said blades relatively to the pit, whereby at least one of said blades, upon actuation of the power means, may move in a dragging action across the cut flesh of the half fruit without gouging into the flesh, through a short, pit-locating movement up to and in contact with the edge of the pit, and thereafter through the power-transmitting mechanism both of said blades will move and with equalized speeds through the flesh of the fruit around the under surface of the pit whereby to sever the pit.

Power-transmitting connections between the source of power and the two pitting blades are combined with a lost motion connection because one of the pitting blades is not provided with a pit-locating lateral movement, and such first blade will not begin its pit-severing action until after the completion of the pit-locating movement of the second cooperative blade, the arrangement being such that after such pit-locating movement of said second blade, both of said blades will then move to cut through the flesh of the fruit at equalized speeds about the under side of the pit to sever the same. The power-transmitting connections comprise gearing.

While the invention has been shown as applied to a semi-automatic machine, it is evident that, subject to certain limitations, it may be used at each pitting station of a completely and fully automatic machine, or conversely it may be applied to even a simpler type of semi-automatic or hand machine. It will also be evident that the broad features of the invention of the present application are not limited to the exact details of construction but are capable of being embodied in equivalent devices for accomplishing substantially the same function in substantially the same manner to produce substantially the same results.

Referring now to the drawings in detail, there is provided in the semi-automatic machine a support or upright 2 upon which is mounted a table 4, preferably of horizontal disposition. The upright 2 has at its foot a laterally extending projection 6, to the outer end of which is pivoted, as at 8, a treadle 10 provided with a central opening 12 through which passes a rod 14. This rod 14 is provided with a pair of adjustable nuts 16 which may be threadedly adjusted on the rod to determine when the rod 14 is to be actuated, during the downward movement of the treadle 10. The outer end of treadle 10 is provided with an ear 18 to which is pivoted a second rod 20, which is the power-actuating rod for the pitting mechanism hereinafter described. A spring 22 is connected at one end to the support 2 and at the other end to the ear 18 for normally urging the treadle to upward position.

The table 4 is provided on its upper surface with a bracket 24 which extends outwardly laterally therefrom to form a horizontal support or platform. This platform is formed with a central yoke shaped portion 26 (Figure 4), apertured centrally to receive a threaded sleeve 28 in which slides a plunger 30, the upper end of which is threadedly connected to any type of substantially recessed half fruit holder 32, which is specifically shown as a shallow cup-shaped member. The bottom of the sleeve 28 is closed but is preferably provided with an adjusting bolt 34 (Figure 6) having a plunger 36 on its inner end, which presses against a coiled spring 38 in turn pressing against the bottom side of the plunger 30. By means of this adjustment the pressure applied to the fruit held in the fruit holder 32 may be adjustably determined. The sleeve 28 is also adjustably mounted in the platform 24 by means of adjusting nuts 40. The support 24 is likewise provided with a resilient sheet metal presser plate 42 fixedly connected at one end thereto as at 44, the opposite end 46 of this presser plate being free. The same is resiliently disposed over the fruit holder 32.

It will be evident that a half fruit, particularly a half peach with the pit cut or sawed in half and integral with the flesh of the half peach, may be inserted in the cup 32 by depressing the cup downwardly to permit the half peach or half fruit to be slipped in place in the cup beneath the resilient presser plate 46, so that the peach will thereafter resiliently be held in position between these two elements. The presser plate 46 is provided with a central opening considerably larger than the maximum diameter of a maximum size pit of the maximum size half fruit. This central opening is indicated at 48 (Figure 7). In addition, presser plate 46 is provided at its outer end with an opening through which the rod 14 passes, a spring 50 being coiled between the marginal edges of said opening and a nut 52 threaded on the outer end of rod 14, whereby said spring serves resiliently to compress the presser plate 46 downwardly onto the cut fleshy portions of the half fruit while it is supported in the fruit holder 32, as shown in Fig. 8.

The support 24 has bolted thereto a pair of spaced apart brackets 54 and 56 (Figures 1 and 4), each of which is substantially U-shaped. The legs of these brackets 54 and 56 form bearings for a pair of shafts 58 and 60. These shafts are identical in construction. Each one of these shafts supports opposed gears of a bevel gearing. The gears 62 on each shaft are formed with an interconnecting yoke 64, which yoke in turn is provided intermediate its length with a pitter blade 66, the blade being preferably screwed thereto, as at 68. Innermost bevel gears 70 of this gearing have an integral sleeve 74. The sleeves in turn are integrally connected by means of a yoke 76. In addition, the bevel gears 62 and 70 of each pair are interconnected by means of a meshing bevel pinion 78 on a stub shaft 80 in a bearing 82 carried by the support 24. The yoke 76 also carries a shaft 84, the shaft passing through registering apertures in yoke 76 and being suitably and pivotally held in place by means of nuts 86. Shaft 84 forms a support for a sleeve 88 having a depending bracket 90, which forms a support for a pitter blade 92 disposed oppositely to and cooperative with pitter blade 66, the blade being secured to bracket 90 as by means of screws 94. In addition, the sleeve 88 is provided with a depending arm 96, the lower end of which carries a laterally extending pin 98 adapted slidably to move in a slot 100 formed in a stationary bracket 102 caried by the support 24. The slot 100 in this bracket, as shown clearly in Figs. 2 and 3, is elongated in a horizontal plane. This slot is formed as a part of an arc struck from the center of the shaft 84. The slot is substantially horizontal in disposition, is stationary, and the pin 98 is adapted to move arcuately therethrough about the center of the shaft 84 as an axis. The depending bracket 90 of the pitter blade 92 is provided with a laterally extending arm 104 and has a pivotal connection 106 to the vertical rod 20.

Shaft 60 at its opposite ends is received in fixed supports 108 and 110. In a similar manner shaft 58 is received in fixed supports 108 and 110, support 108 being disposed laterally of the arm 96.

The pitting blades 66 and 92 are formed on their bottom-most points with cutting edges which conform substantially to the maximum diameter of the pit to be severed. As shown clearly in Figs. 6-12, inclusive, each pitter blade is shaped somewhat as a quarter of a sphere (preferably an oblate sphere) and these pitting blades are adapted to be positioned in the operation of the device on opposite sides of the half pit, and are adapted to be moved simultaneously around the under side of the half pit, severing the flesh, until they come into closed position, at which time the flesh is completely severed. The body of each blade is preferably not concentric with the pin 98 but the portions of the body become increasingly distant from the pin as said portions become further distant from the cutting edge. In this way as the blades progress through the fruit the outside faces of the blades will crowd against the separated surfaces of the flesh and thereby force the flesh away from the pit and by reaction force the blade against the pit. In some instances the blades may be formed so that this crowding action is accomplished solely by the plate 46 and not by the arcuate shape of the blades themselves.

From the foregoing, it can be seen that the triangle formed between the axes of the shafts 84 and 58 or 60 (see Figure 2) and the axis of the pin 98 provide an arrangement which makes it impossible for the arm 76 to turn about the aligned shafts 58 and 60, until the pin 98 has reached a coaxial position with shafts 58 and 60, which is the common point of turning of both the arms 76 and 96. Also, since the blade 66 has no lateral or pit finding movement at all and is fastened directly to yoke 64 (see Figure 4), it also must turn in a true arc about the aligned axes of the shafts 58 and 60. It is also thought that this triangular disposition of the various axes as above described makes the side or pit locating movement possible. For instance, suppose it were possible to turn the arms 76 and 96 about the coaxial shafts 58 and 60 and that the friction about the axis 84 were greater than the friction of the gear trains, pressure downwardly on the rod 20 would cause rotation about the axis 58 of the arm 76 because turning starts at any point where the resistance of turning is least. Since turning of the lever 76 about the shaft 58 cannot take place until the pin 98 coincides with shaft 58, the only thing that can take place is the pit locating movement.

The foregoing is based on the theory that all joints, the slot and pin, have perfect fits. In practice, it is not possible since there is a slight divergence from this, and the arm 76 can turn slightly before the pin 98 reaches the axis 58. This turning, however, is negligible because, if the joints are too loose, the blades would not meet properly at the finish of their cut.

Where the pit is so large that the pin 98 does not reach the axis 58 when the pit is contacted, the slight turning does take place, after which the pin 98 snaps into register with the axis of shaft 58, thereby tending to lift or slightly tear the pit out of the cavity before it cuts around in a true arc. In actual practice the pit in the cavity showed marked evidence that a slight tearing had taken place when the pit was removed.

Figure 5:
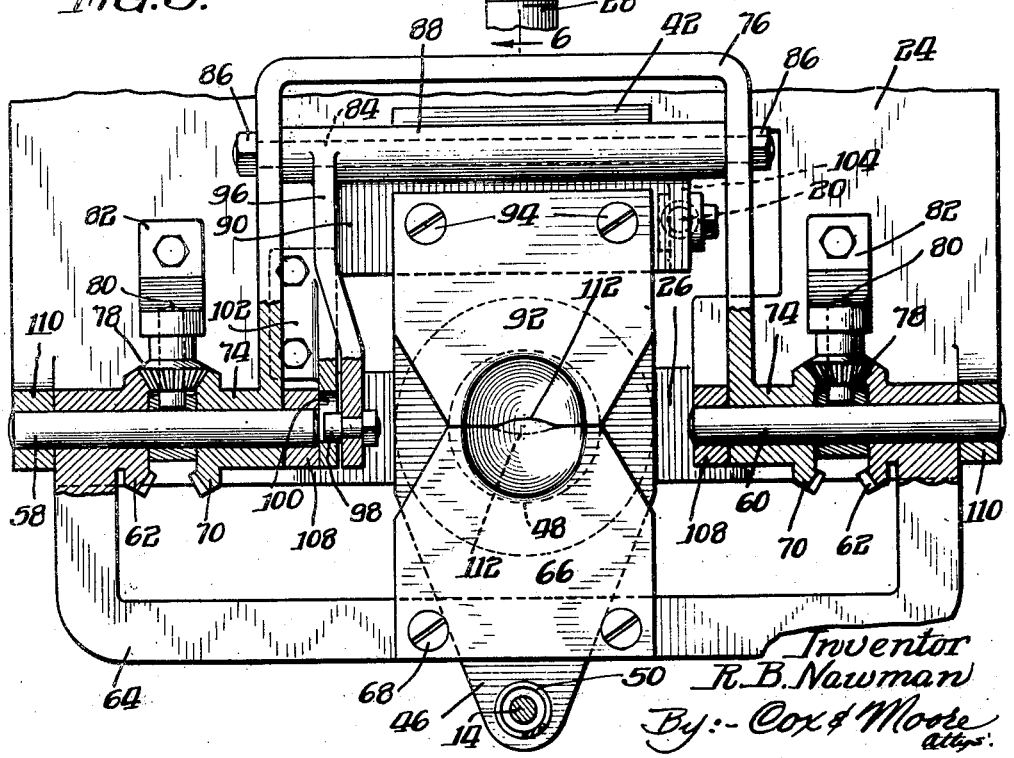
Fig. 5 is a plan sectional view of the machine, taken on line 5—5 of Fig. 8.

It will thus be seen that the shifting blade definitely presses laterally against the side of the pit, thereby tending forcibly to eject the pit from the peach during the pitting operation. The bottom of each cutter blade is provided with a centrally disposed, downwardly extending cutting point or lip 112 which, in the motion of the right-hand blade, as shown in Fig. 6, is the only part of the blade that draggingly contacts the surface of the cut fruit during its pit locating movement. These two lips in the closed position of the pitter blades, as shown in Figs. 5 and 8, are adapted to overlap with a shearing action whereby more effectively to make a complete and clean severance of the flesh of the half fruit from the pit.

In the operation of the device, after the half peach or half fruit has been placed in the fruit holder as hereinbefore set forth, with the half pit in predetermined position beneath the zone of action of the pitting blades 66 and 92, upon depression of the treadle 10 the pull rod 20 will be likewise depressed, whereby through its connection 106 with the bar 104 it will cause the arm 96 to pivot about the shaft 84 as an axis in a clockwise direction, as shown in Fig. 2. Inasmuch as the arm 96 carries the cutter blade 92, this will cause the movement of the cutter blade from the position shown in Fig. 6 to the position shown in Fig. 7, thus moving the cutter blade laterally across the cut fleshy surface of the half fruit from a point removed from the marginal edge of the pit up to and into contact with the periphery of the pit, as shown in Fig. 7. During this dragging or pit-locating movement of the blade 92, the lip 112 thereof will slightly cut into and drag across the flesh of the fruit. The major portion of the cutting edge of this pitter blade will not cut into the flesh of the fruit. As soon as the downwardly projecting lip 112 of this pitting blade 92 contacts the under surface of the pit at the cut flesh of the pit, further movement of this pitting blade is arrested, the marginal edge of the pit now forming a stop arresting any further pit-locating movement of the blade 92. At this instant the pivoting of the arm 96 is shifted from the pivotal axis 84 to the center of the pin 98, which has been shifting laterally along the elongated slot 100 during this pit-locating movement of the blade 92. Inasmuch as the bottom surface of this slot 100 is substantially horizontal being formed as an arc of a circle whose center is the axis of the pin 84, the pin 98 is compelled to move in a substantially horizontal plane approaching the axis of the two coaxial shafts 58 and 60.

During this lateral pit-locating movement of the blade 92, the cooperative pitting blade 66 has remained stationary. This has been permitted by the movement of the pin 98 along the slot 100 until the pin 98 contacts the end of slot 100. Upon further downward movement of the pull rod 20, the arm 96 will pivot about the axis formed by the pin 98 in its newly shifted position, and simultaneously therewith the yoke 76 will likewise be moved in the same direction as the arm 96. This movement of yoke 76 is due to the interconnection of the shaft 84 with this yoke 76 at 86. Movement of yoke 76 will cause rotation of the integral bevel gears 70 through the integral connection 74, and due to the fixed stub shaft 80 and intermeshing gears 78 will cause rotating movement of the corresponding bevel gears 62 in an opposite direction, which through their integral yoke connection 64 will cause the yoke 64 to swing outwardly in a counter-clockwise direction and oppositely to the arm 96. Inasmuch as this yoke carries the other cooperative pitting blade 66, this pitting blade will swing simultaneously about the fixed coaxial shafts 58 and 60 as an axis. The pin 98 at this time must have taken up a substantially coaxial position with the shafts 58 and 60.

In certain instances, when the pitter blades are positioned on opposite sides of the pit and before the pit-locating movement is started, if the blade 66 is preliminarily positioned in spaced relation from the adjacent edge of the pit, this blade will remain at this point during the pit-locating movement of the opposite blade 92 until the blade 92 strikes the edge of the pit, at which time the blade 92 will then move about the pin 98 as an axis and will follow closely the under side of the right-hand side of the pit.

Blade 66, on the contrary, will move about the coaxial shafts 58 and 60 as a center, beginning its severing cut through the flesh of the fruit at the cut face of the half fruit at the point where it was initially positioned. In other words, the blade 66 will not have a preliminary movement across the cut face of the fruit into contact with the edge of the pit, but will begin a downward circular cut through the flesh of the fruit, the point of start being spaced from the marginal edge of the pit. In either case the blade 66 will move in a true circular arc about the coaxial shafts 58 and 60 as a center.

In instances where the blade 92 in its pit-locating movement strikes the edge of the pit before the pin 98 has moved over to a position where it is coaxial with the shafts 58 and 60, upon downward swinging movement of the blades the blade 92 will tend to move to the left to permit the pin 98 to take up a position coaxial with the shafts 58 and 60, and this latter movement will result in raising upwardly and slightly tearing the pit from the flesh of the peach sufficiently to permit of this, and after which the two blades will then move around in truly circular paths about the joint coaxis of the pin 98 and the shafts 58 and 60.

In this downward simultaneous swinging of the two pitter blades 66 and 92, they will move from the position shown in Fig. 7 to the position shown in Fig. 8. The shafts 58, 60 and the pin 98, contacting with the bottom of the slot 100, will cause these pitter blades to move in true circular arcs about the shafts 58, 60 as axes and will cause these pitter blades closely to move about the under side of the pit, cutting the flesh therefrom. By means of this construction the minimum of flesh is removed from the flesh of the fruit during the pitting action.

During this pitting action, as the pitter blades move downwardly along the under side of the pit, due to the downward movement of the treadle, the treadle strikes the adjustable nut 16, and depresses the rod 14, which through its spring connection 50 with the presser plate 46 causes the presser plate to be pulled down with progressively increasing pressure against the fleshy portions only of the half fruit, as shown clearly in Fig. 8. Inasmuch as the flesh of the half fruit is positively pulled down while the pitter blades 66 and 92 are moving in fixed paths around the under side of the pit, the pit will be prevented from moving downwardly while it is being cut by the arcuate cutting blades. This pitting action will serve to hold the pit in a predetermined horizontal plane while the fleshy part of the half fruit will be depressed away from said plane, thereby causing the pitter blades more closely to follow the under side of the half pit and effect a clean severance of the flesh from the under side of this half pit.

Figure 9:
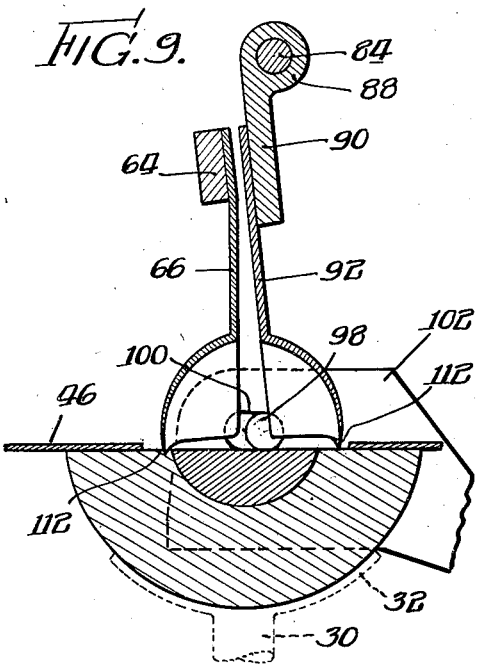
Figure 10:
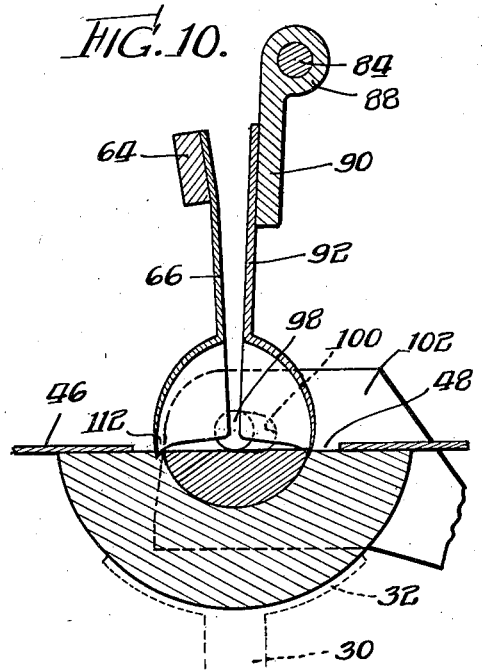
Figure 11:
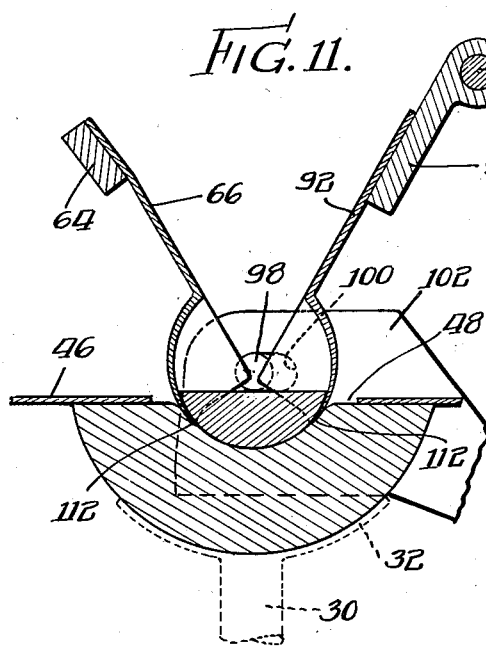
Figure 12:
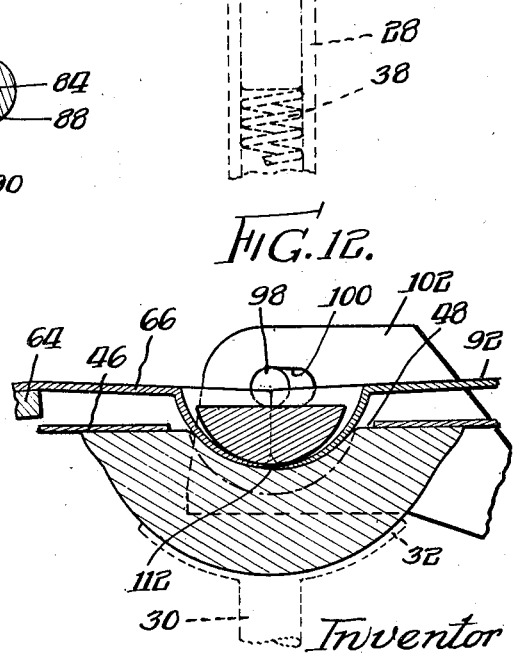

By reason of the foregoing construction and operation, it will be apparent that a very simple type of means is provided for pitting half or whole pits from half fruits in a manner such as to accommodate unsymmetrically located pits of varying diameters, one of the blades moving from a position remote from the edge of the pit, first across the surface of the fruit without substantially digging into the flesh of the fruit, until the edge of the pit is located slightly below the surface, as by means of the projecting lip, then both of the blades swinging simultaneously in opposite directions about a common axis disposed substantially closely to the cut face of the half pit, thereby making a shallow cut in the cut face of the half fruit, the depth of the cut being determined by the distance of the axis of the shafts 58 and 60 and pin 98 from the under side of the half pit. It will be noted that the spring 22 when released will function to move the pull rod 20 upwardly, which in turn will restore the pitter blades to their original position, as shown in Fig. 9. ready for the next pitting action. By reason of the slot and pin connections the pitter blade 66 is permitted to remain stationary at the cut face of the half fruit, either spaced slightly from or relatively close to the nearest margin of the pit, while the opposite or cooperative pitter blade 92 is moved laterally across the cut face of the fruit from a point remote from the margin of the half pit up to and into contact with the margin of the pit, and thereafter through the gearing both pitting blades are operated from the same source of power and move simultaneously and at equalized speeds through the cut flesh of the half fruit in a pit severing operation.

It will be noted that in the present mechanism the spring 50 causes pressure on the fruit during the entire pitting operation, and that this pressure increases as the foot treadle 10 moves down, the maximum pressure occurring at the finish of the cut.

Changes may be made in the form, construction and arrangement of the parts without departing from the spirit of the invention or sacrificing any of its advantages, and the right is hereby reserved to make all such changes as fairly fall within the scope of the following claims.

Having thus described the invention, what is claimed as new and is desired to be secured by Letters Patent of the United States is:

1. A device for pitting half fruit having a pit section disposed on its cut face and unsevered from the half fruit, comprising means for supporting the half fruit with its cut face and pit section exposed, a plurality of pitting blades, means for positioning said blades on opposite sides of the pit at the cut face of the half fruit, means to cause one of said blades to move laterally to contact the edge of the half pit, means for causing the cooperative blade to remain substantially at rest during lateral movement of said one blade, said means including mechanism for causing said one blade when brought into contact with the pit edge then to cut through the flesh of the half fruit adjacent the periphery of the pit from one side thereof, and means initiating movement of said cooperative blade when said one blade contacts the pit to cause the cooperative blade to simultaneously and at equal speed cut through the half fruit from the other side of the pit.

2. A device for pitting half fruit having a pit section disposed on its cut face and unsevered from the half fruit, comprising means for supporting the half fruit with its cut face and pit section exposed, a pair of pitting blades, means to position the blades on opposite sides of the pit, one of the blades being positioned relatively remote from the margin of the half pit, actuating means, and mechanism interconnecting the actuating means and the remote blade for causing said remote blade to travel laterally across the cut face of the half fruit into contact with the half pit, and without substantially cutting into the flesh of the half fruit, and means including gearing interconnecting the blades for causing both blades to swing simultaneously when the remote blade contacts the pit and in approaching directions at equalized speeds about the pit to sever the pit from the fruit.

3. A device for pitting half fruit having a pit section disposed on its cut face and unsevered therefrom, comprising means for supporting the half fruit with its cut face and pit section exposed, a pair of pitting blades, and actuating means for said blades including gearing interconnecting said blades to compel said blades to move relatively to locate the pit and simultaneously initiate swinging movement of the blades about the pit when located by one of the blades.

4. A device for pitting half fruit having a pit section disposed on its cut face and unsevered therefrom, comprising means for supporting the half fruit with its cut face and pit section exposed, a shiftable yoke pivotally mounted on said support, said yoke having on its outer end means forming a pivotal axis, a pitting blade carrier pivotally mounted on said second pivotal axis for swinging movement thereabout, a pitting blade carried by said carrier, an arm on said carrier, a pin on said arm, a bracket on said support having a slot disposed substantially parallel to the cut face of the half fruit and adapted slidingly to receive said pin, a gear carried by said first mentioned yoke, a second gear, mechanism meshing with said first member and carried by said support, a second yoke, a third gear meshing with said second member, said second yoke swinging about the axis of the first yoke, a second pitting blade carried by said second yoke, and actuating means connected to at least one of said yokes.

5. A device for pitting half fruit having a pit section disposed on its cut face and unsevered therefrom, comprising means for supporting the half fruit with its cut face and pit section exposed, means forming a main pivotal axis disposed relatively close to the central portion of the pit section and above the cut face of the half fruit, a pair of yokes pivotally mounted on said axis for swinging movement thereabout, gearing interconnection between said yokes, a pitting blade carried by one of said yokes, the other of said yokes having on its outer end means forming a second pivotal axis disposed parallel to the first mentioned pivotal axis, said second pivotal axis including an arm, a second pitting blade carried by a portion integral with said arm, means forming a stationary elongated slot, the elongated central axis of said slot passing through the center of said first mentioned pivotal axis, a pin on said arm adapted to slide along said slot, an actuator, and means for actuating the first-mentioned pitting blade from said actuator.

6. A device for pitting half fruit having a pit section disposed on its cut face and unsevered therefrom, comprising means for supporting the half fruit with its cut face and pit section exposed, a pair of coaxially positioned shafts disposed in spaced relation on opposite sides of the supporting means, relatively close to the cut surface of the half fruit, supporting means for said shafts, a pair of yokes, each having a pair of bearings, said bearings being pivotally mounted on said shafts, gearing interconnecting the bearings of said yokes, one of said yokes at its outer end having a sleeve pivotally connected thereto, said sleeve having a central depending bracket, a pitting blade connected to said bracket, said sleeve having a depending arm, a pin carried by said arm, a bracket on said support having an elongated slot, the longitudinal axis of said slot passing through the central axis of said registering shafts, said pin sliding in said slot, a second pitting blade connected to the other yoke, and an actuator connected to one of said yokes.

7. A device for pitting half fruit having a pit section disposed on its cut face and unsevered therefrom, comprising means for supporting the half fruit with its cut face and pit section exposed, a pair of coaxially positioned shafts disposed in spaced relation on opposite sides of the supporting means, relatively close to the cut surface of the half fruit, supporting means for said shafts, a pair of yokes, each having a pair of bearings, said bearings being pivotally mounted on said shafts, gearing interconnecting the bearings of said yokes, one of said yokes at its outer end having a sleeve pivotally connected thereto, said sleeve having a central depending bracket, a pitting blade connected to said bracket, said sleeve having a depending arm, a pin carried by said arm, a bracket on said support having an elongated slot, the longitudinal axis of said slot passing through the central axis of said registering shafts, said pin sliding in said slot, a second pitting blade connected to the other yoke, an actuator connected to one of said yokes, means mounted on said support adapted to contact the cut flesh of the half fruit in spaced relation from the pit, and means to cause said contacting means to press upon the cut flesh only of the half fruit during a portion of the pitting action of said pitting blades.

8. A device for pitting half fruit having a pit section disposed on its cut face and unsevered therefrom, comprising means for supporting the half fruit with its cut face and pit section exposed, said means comprising an elongated sleeve, a spring within said sleeve, adjustable plunger means for compressing said spring, a plunger in said sleeve urged by said spring, said plunger carrying the half fruit supporting means, means contacting the cut face of the half fruit supported in said supporting means, said contacting means being spaced from the peripheral edge of the pit at the cut face of the half fruit, a pair of pitting blades, an actuator, means for causing one of said blades to move laterally across the cut face of the half fruit into contact with the pit and to thereafter cause said blades uniformly to move through the flesh of the fruit to sever the pit, and means interconnected with said actuator for causing said flesh-contacting means to press with progressively increasing force on the cut flesh only of the fruit in a direction away from the pit during at least a portion of the pit-severing operation.

9. A device for pitting half fruit having a pit section disposed on its cut face and unsevered therefrom, comprising means for supporting the half fruit with its cut face and pit section exposed, a pair of pitting blades, means for positioning said blades at the cut face of the half fruit on opposite sides of the pit section, said pit section having a severed exposed face, means forming a pivotal axis of swinging for one of said blades, said pivotal axis being relatively remote from the severed face of the pit for causing said blade to move laterally across the cut face of the half fruit in a pit-locating movement, means forming a shifting pivotal axis for said blade, said second mentioned pivotal axis being disposed relatively close to the severed face of the pit and slightly thereabove, the line of shift of said second mentioned pivotal axis being substantially parallel to the severed face of the half pit, and means including gearing for swinging both of said blades about said second mentioned axis as said axis shifts to a point immediately over the central portion of the severed pit whereby to cause said blades simultaneously to move in approaching directions in true circular arcs with said axis as a center around the under surface of the pit to sever the same.

10. In a device for pitting half fruit, the combination of means for supporting the half fruit with its cut face exposed, a plurality of pitting blades, means for positioning said blades on opposite sides of the pit in the cut face of the half fruit, means for moving said blades relatively across the cut face of the half fruit to cause a blade to contact an edge of the pit, said means including mechanism for causing the contacting blade when brought into contact with the pit edge to cut through the flesh of the half fruit adjacent the periphery of the pit from one side thereof, and means operatively interconnecting said blades for initiating movement of the cooperative blade with said pit contacting blade when the latter contacts the pit to cause the cooperative blade to simultaneously and at equal speed cut through the half fruit from the other side of the pit.

11. In a device for pitting half fruit, the combination of means for holding the half fruit with its cut face exposed, a shiftable mounting member pivotally mounted on said support for swinging movement about a first axis, a pitting blade pivotally mounted on said mounting member for swinging movement about a second axis, an arm fixed relative to the blade, a bracket on said support, a pin and slot connection between said arm and said bracket for causing the blade to swing about the second axis relative to the mounting member and then to swing about the first axis with the mounting member, a second mounting member pivotally mounted on said support, a second pitting blade carried by said second mounting member, gearing interconnecting said mounting members for causing simultaneous swinging of said mounting members, and actuating means connected to the first-mentioned pitting blade.

12. In a device for pitting half fruit, the combination of means for holding the half fruit with its cut face exposed, a support, shiftable mounting means pivotally mounted on said support for swinging movement about a first axis in juxtaposition to the cut face of the half fruit, a pitting blade pivotally mounted on said mounting means for swinging movement about a second axis relatively remote from the first axis and parallel to the first axis to permit the pitting blade to swing across the cut face of the half fruit into contact with an edge of the pit, a second mounting means pivotally mounted on said support for swinging movement about an axis in the same plane as the first axis, a second pitting blade carried by said second mounting means, means providing a pin and slot connection between the first blade and its mounting means to permit relative movement of the first blade to its mounting means and about the second axis, actuating means connected to said first pitting blade, and gearing interconnecting said mounting means for causing simultaneous movement of said mounting means in opposite directions about their co-planar axes upon contact of the first pitting blade with the pit of the fruit.

13. In a device for pitting half fruit, the combination of means for holding the half fruit with its cut face exposed, a support, a pair of mounting members pivotally mounted on said support for swinging about a common first axis in juxtaposition and parallel to the cut face of the half fruit, gearing interconnecting said mounting members for causing simultaneous swinging movement of said members about a common axis in opposite directions, a pair of pitting blades carried by said mounting members, one of said blades being pivotally mounted on its mounting member for swinging movement relative to its mounting member about an axis relatively remote from, but parallel to said common axis, an arm rigid with said last-mentioned pivotally mounted pitting blade, a member stationary with respect to the common axis, a pin and slot connection between said arm and said stationary member, said slot being aligned with the common axis and concentric to the pivot axis of the pivotally mounted blade, and means for actuating the pivotally mounted pitting blade.

14. In a device for pitting half fruit, means for holding half fruit with its cut face exposed, a pair of opposed pitting blades, mounting members for said blades, said mounting members being pivoted for swinging movement of said blades about a common axis, said blades being mounted on said members for relative approaching movement to locate the pit by contact of a blade with the pit, means for causing a relative approaching movement of said blades to locate the pit, and means interconnecting said blades for causing said blades simultaneously to swing at equalized speeds about the common axis of the mounting members upon engagement of a blade with the pit.

15. A device for pitting half fruit comprising a fruit holder for supporting a half fruit with its cut face and pit section exposed, lever means pivoted for swinging movement about an axis substantially in the plane of the cut face of the half fruit, additional lever means pivoted for swinging movement about an axis substantially coincident with the first-mentioned axis, means interconnecting said two lever means for simultaneous swinging movement about said substantially coincident axis, a first pitting blade secured to one of said lever means for swinging movement therewith, a second pitting blade pivoted to the other of said lever means for relative swinging movement about an axis remote from the cut face of the half fruit and across the cut face of the half fruit into contact with a marginal edge of the pit section, means for swinging said second pitting blade about said remote axis and thereafter swinging the associated lever means about the axis substantially in the plane of the cut face of the half fruit, and means for preventing swinging movement of said lever means during the swinging of said second pitting blade about said remote axis.

ROLLIE B. NAWMAN.